3,108,985
POLYSILOXANE POLYMER WITH A CALCINED VOLATILE-FREE FILLER
Donald E. Weyer, Midland, Mich., assignor to The Dow Corning Corporation, Midland, Mich., a corporation of Michigan
No Drawing. Filed Nov. 2, 1960, Ser. No. 66,707
2 Claims. (Cl. 260—37)

This invention relates to siloxane compositions having heat stabilities equivalent to ceramics and is a continuation-in-part of applicant's copending application Serial No. 839,606, filed September 14, 1959, now abandoned.

Siloxane molding and coating compositions comprising siloxane resins and fillers have been known for many years. To date, the primary commercial siloxane molding compositions comprise siloxane resin mixed with glass fibers, glass fabrics or asbestos. In addition, the compositions may contain minor amounts of other fillers such as sand or diastomaceous earth. Such molding compositions give satisfactory performance at temperatures up to 300° C. At temperatures approaching 500° C. or above, the molded article warps or disintegrates depending upon the composition. Consequently, they are not useable over the temperatures range from 300° C. to 1500° C. or above.

Ceramic molded articles have long been known. These are generally prepared by mixing a ceramic material with water then slip casting the slurry and allowing the slurry to dry and thereafter firing at temperatures of 1000° C. or above depending upon the ceramic employed. Due to the use of water and to the high firing temperature needed to solidify the molded article, there always occurs a large amount of shrinkage in the molded article during firing. Furthermore, the amount of shrinkage that takes place is not predictable to a high degree of accuracy and is often accompanied by actual warping of the article. It has heretofore been impossible to prepare satisfactory ceramic articles of intricate shapes by simple molding techniques, particularly where close dimensional tolerances are required in the finished article. Consequently at the present time ceramic articles which have to meet rigid dimensional specifications are molded, fired and then ground to the correct dimension. This operation is quite expensive with the result that many ceramic insulators and connectors are quite expensive.

It is the primary object of this invention to provide molding or coating compositions which combine the ease of fabrication of organic resin molding or coating compositions with the thermal stability of ceramic molding or coating compositions.

Another object is to provide a siloxane molding composition which is useable over a temperature range from −65° C. to +1500° C. or above. Other objects and advantages will be apparent from the following description.

This invention relates to a composition consisting essentially of from 5 to 30% by weight of a phenyl lower aliphatic hydrocarbon siloxane resin having an average of from .9 to 1.5 total phenyl and lower aliphatic hydrocarbon radicals per silicon atom and from 70 to 95% by weight of a volatile-free filler of the group consisting of magnesium silicate, aluminum silicate, lithium aluminum silicate, magnesium oxide, silica, alumina, zinc oxide, zirconium silicate, silicon carbide and thorium oxide.

The resins employed in the compositions of this invention can be any phenyl lower aliphatic hydrocarbon siloxane resin having the specified ratio of hydrocarbon groups to silicon. The term "lower aliphatic hydrocarbon" has reference to aliphatic hydrocarbon radicals of less than 4 carbon atoms. For the purpose of this invention the distribution of the phenyl and lower aliphatic hydrocarbon radicals on the silicon is not critical. Thus, for example, the resin can be any combination of the following siloxane units provided the total number of phenyl and lower aliphatic hydrocarbon radicals falls within the specified range; dimethylsiloxane, monomethylsiloxane, phenylmethylsiloxane, monophenylsiloxane, diphenylsiloxane, $SiO_2$, monoethylsiloxane, ethylmethylsiloxane, diethylsiloxane, phenylethylsiloxane, monopropylsiloxane, dipropylsiloxane, phenylpropylsiloxane, ethylpropylsiloxane, methylpropylsiloxane, divinylsiloxane, monovinylsiloxane, methylvinylsiloxane, ethylvinylsiloxane, propylvinylsiloxane, phenylvinylsiloxane, diallylsiloxane, monoallylsiloxane, allylmethylsiloxane, allylethylsiloxane, allylpropylsiloxane, allylphenylsiloxane, and allylvinylsiloxane. The resins may also contain minor amounts of triorganosiloxane units in which the substituent groups are any of those above specified.

The siloxane resin can be a single copolymer or a mixture of two or more copolymers. Preferably, there should be at least 20 mol percent each of phenylsiloxane units and lower aliphatic hydrocarbon siloxane units in the resin. Siloxane resins of the above type are well-known, commercially available items.

The gist of the present invention resides in the use of volatile-free fillers of the specified type. The term "volatile-free" means that the filler is free of volatile materials such as water (either in the form of absorbed water or in the form of hydroxyl groups), or is free of other materials which give off volatiles upon heating such as carbonates or organic materials.

In general, volatile-free fillers are prepared by calcining the materials at temperatures above 500° C. This drives off all of the water and produces an anhydrous material. It also breaks down any carbonates into carbon dioxide which escapes.

In order to obtain the beneficial results of this invention it is necessary that the filler be of the specified compositions, namely, magnesium silicate, aluminum silicate, lithium aluminum silicate, magnesium oxide, silica, alumina, zinc oxide, zirconium silicate, silicon carbide and thorium oxide. The crystalline structure of these materials is not critical and they can be of either natural or synthetic origin. The filler can be in the form of fibers or particles. The particle size is not critical although finely divided powered materials are preferred. It should be understood that combinations of any of these fillers can also be employed.

The compositions of this invention are composed essentially of the above defined resins and fillers. However, they can also contain catalysts to aid in the curing of the resin, mold release agents to aid in removal from the mold, and small amounts of pigment such as ferric oxide or the like to produce the desired color.

Suitable catalysts include metal salts of carboxylic acids, such as lead stearate, lead 2-ethylhexoate, dibutyltindiacetate, zinc octoate, or any of the other catalysts suitable for curing siloxane resins.

The compositions of this invention can be employed either as a conventional siloxane molding composition (that is for uses in the temperature range of below 300° C.) or they can be employed as ceramic molding compositions (that is in the temperature range above 300° C. and up to 2000° C.). In order to obtain materials in the latter range, it is only necessary to mold the composition in a conventional molding apparatus and then to heat the composition at a temperature above 500° C. until the desired properties are developed. In general, this will require less than 24 hours. If desired, however, the materials can be fired at higher temperatures and in some cases this may be desirable.

The molded articles are useful as electrical insulators, connector bases and any other use for which silicone molding compositions or ceramic articles are employed.

The composition of this invention can be employed to fabricate coatings. This is done by applying the composition to a surface from a solution or suspension and thereafter heating the coated article at a temperature above 500° C. until the desired hardness is obtained.

The following examples are illustrative only and should not be construed as limiting the invention which is properly delineated in the appended claims.

EXAMPLE 1

The resin employed in this example was a phenylmethylsiloxane resin having an average of 1.15 total methyl and phenyl radicals per silicon and having a phenyl to methyl ratio of 1.13. This resin was mixed with the fillers shown in the table below in the amounts specified therein. In each case the composition also contained 1% by weight calcium stearate as a mold release agent and .28% by weight (based on the weight of resin) PbO as a catalyst. Each mixture was molded under a pressure of from 1000 to 2000 p.s.i. at 175° C. for 15 minutes. Each sample was then heated 2 hours at 250° C. and then 24 hours at 550° C. The physical properties of each of the molded articles was determined at room temperature after heating 2 hours at 250° C. and 24 hours at 550° C.

EXAMPLE 3

Equivalent results are obtained when a mixture of 10% by weight of a resin comprising 50 mol percent monophenylsiloxane and 50 mol percent monoethylsiloxane, 45% by weight aluminum silicate and 45% by weight zinc oxide and 9% by weight lithium aluminum silicate is molded and fired under the conditions of Example 1.

EXAMPLE 4

Equivalent results are obtained when the folling resins are substituted in the procedure of Example 1:

A copolymer of 10 mol percent dimethylsiloxane, 25 mol percent phenylmethylsiloxane, 5 mol percent diethylsiloxane, 35 mol percent monophenylsiloxane and 25 mol percent monomethylsiloxane.

A copolymer of 5 mol percent $SiO_2$, 5 mol percent monopropylsiloxane, 10 mol percent diphenylsiloxane, 50 mol percent monophenylsiloxane and 30 mol percent monomethylsiloxane.

EXAMPLE 5

The resin employed in this example was a copolymer of 60.2 mol percent phenylmethylsiloxane, 35 mol percent phenylvinylsiloxane and 4.8 mol percent phenylmethylvinylsiloxane. A mixture of 12 percent by weight of this resin, 87 percent by weight thorium oxide, 1 percent by weight calcium stearate and 3 percent by weight (based on weight of resin) of dicumyl peroxide as a catalyst was molded under a pressure of 4000 p.s.i. at 121° C. for 15 minutes. The sample was then heated at temperature increasing at 55.6° C. per hour until a temperature of 982° C. was reached. The heating was continued for 3 hours at this temperature. A strong ceramic-like article was obtained.

EXAMPLE 6

A mixture of 12 percent by weight of the resin of Example 1, 87 percent by weight zirconium silicate, 1 percent by weight calcium stearate and .56 percent by weight (based on weight of resin) of PbO was molded under a pressure of from 1000 to 2000 p.s.i. at 175° C. for 15 minutes. Each sample was then heated 72 hours at 260° C. and then 3 hours at 982° C. The physical properties of the molded article was determined at room temperature after heating 72 hours at 260° C. and 3 hours at 982° C. The results are shown in the table below.

*Table*

| Formulation, percent by weight | | Flexural strength in p.s.i. | | Impact strength in ft. lbs. | | Compressive strength in p.s.i. | |
|---|---|---|---|---|---|---|---|
| Resin | Filler | 250° C. | 550° C. | 250° C. | 550° C. | 250° C. | 550° C. |
| 17 | 82% magnesium silicate | 6,300 | 1,690 | 0.86 | 0.36 | 14,000 | 6,500 |
| 17 | 82% alumina | 6,900 | 976 | 0.32 | 0.32 | 13,700 | 7,000 |
| 17 | 38% magnesium oxide, 38% sand, 6% magnesium silicate | 5,020 | 805 | 0.34 | ---- | 12,800 | 7,100 |
| 20 | 37% quartz, 37% sand, 5% magnesium silicate | 7,500 | 1,170 | ---- | ---- | 15,200 | 7,600 |
| 17 | 50% aluminum silicate, 26% sand, 6% magnesium silicate | 5,310 | 2,060 | 0.36 | ---- | 11,350 | 6,200 |

EXAMPLE 2

A mixture of 17% by weight of the resin of Example 1, 82% calcined magnesium silicate, 1% by weight calcium stearate and .28% by weight (based on weight of resin) PbO was molded into bars by heating 15 minutes at 175° C. under a pressure of 2000 p.s.i. Several of the bars were then placed in an oven and heated at 260° C. for 2 hours. Some of the bars were removed and the flexural strength was checked. The remaining bars were further heated at 555° C. for 72 hours. Some of these were then removed and the flexural strength determined. The remaining bars were then further heated 3 hours at 985° C. and the flexural strength and total shrinkage of these bars was determined. The results are shown in the table below.

*Table*

| Temp., °C. | Heating time in hrs. | Flexural strength in p.s.i. | Percent shrinkage |
|---|---|---|---|
| 260 | 2 | 6,360 | |
| 555 | 72 | 1,000 | .9 |
| 985 | 3 | 1,080 | 2 |

*Table*

| Flexural strength in p.s.i. | | Compressive strength in p.s.i. | | Percent shrinkage | | Percent weight loss | |
|---|---|---|---|---|---|---|---|
| 260° C. | 982° C. | 260° C. | 982° C. | 260° C. | 982° C. | 260° C. | 982° C. |
| 3,730 | 6,180 | 15,500 | 9,103 | .07 | 1.4 | 1.2 | 5.8 |

EXAMPLE 7

A mixture of 17 percent by weight of the resin of Example 1, 82 percent by weight silicon carbide, 1 percent by weight calcium stearate and .28 percent by weight (based on weight of resin) of PbO was molded and fired under the conditions of Example 6. The results are shown in the table below.

*Table*

| Flexural strength in p.s.i. | | Compressive strength in p.s.i. | | Percent shrinkage | | Percent weight loss | |
|---|---|---|---|---|---|---|---|
| 260° C. | 982° C. | 260° C. | 982° C. | 260° C. | 982° C. | 260° C. | 982° C. |
| 9,650 | 4,390 | 19,160 | 10,500 | .36 | .40 | .51 | 6.64 |

That which is claimed is:

1. A heat curable composition consisting essentially of (1) from 5 to 30% by weight of a phenyl lower alkyl siloxane resin having an average of from .9 to 1.5 total phenyl and lower aliphatic hydrocarbon radicals per silicon atom, (2) from 70% to 95% by weight of a volatile-free filler which is free of water, carbonates and organic materials, selected from the group consisting of magnesium silicate, aluminum silicate, lithium aluminum silicate, magnesium oxide, silica, alumina, zinc oxide, zirconium silicate, silicon carbide and thorium oxide, and (3) a curing catalyst for the siloxane resin.

2. A composition in accordance with claim 1 in which the siloxane resin is a phenylmethylsiloxane resin.

References Cited in the file of this patent

UNITED STATES PATENTS 2,615,006   Lane _____ Oct. 21, 1952

FOREIGN PATENTS 805,807   Great Britain _____ Dec. 10, 1958